(12) United States Patent
Shalaby (10) Patent No.: US 8,202,017 B2
(45) Date of Patent: Jun. 19, 2012

(54) UNIVERSAL HITCH WITH INTEGRAL ARTICULATION, CLAMPING AND LOCKING

(76) Inventor: Nadia Shalaby, Cambridge, MA (US)

( * ) Notice: Subject to any disclaimer, the term of this patent is extended or adjusted under 35 U.S.C. 154(b) by 161 days.

(21) Appl. No.: 12/627,241

(22) Filed: Nov. 30, 2009

(65) Prior Publication Data

US 2011/0229253 A9    Sep. 22, 2011

Related U.S. Application Data

(60) Provisional application No. 61/200,598, filed on Dec. 1, 2008.

(51) Int. Cl.
*B62K 27/12* (2006.01)

(52) U.S. Cl. ......... 403/322.4; 280/204; 24/270; 24/271; 403/223

(58) Field of Classification Search .............. 403/49, 403/191, 220, 223, 289, 291, 322.4; 280/204, 280/292; 70/19; 24/68 E, 71 SK, 71 ST, 24/270, 271
See application file for complete search history.

(56) References Cited

U.S. PATENT DOCUMENTS

| | | | | |
|---|---|---|---|---|
| 1,436,317 A * | 11/1922 | Kriescher | ........................ | 24/271 |
| 3,157,932 A * | 11/1964 | Kyrias | ........................ | 24/271 |
| 3,193,796 A * | 7/1965 | Spangler | ........................ | 439/760 |
| 3,533,650 A * | 10/1970 | Smith | ........................ | 285/197 |
| 3,633,956 A * | 1/1972 | Angell | ........................ | 292/256.69 |
| 3,829,125 A * | 8/1974 | Davis | ........................ | 280/204 |
| 4,077,646 A | 3/1978 | Watkins | | |
| 4,150,500 A * | 4/1979 | Delery | ........................ | 36/117.1 |
| 4,307,893 A * | 12/1981 | Ragland | ........................ | 280/204 |
| 4,371,184 A * | 2/1983 | Henden et al. | ........................ | 280/204 |
| 4,381,585 A * | 5/1983 | Morel | ........................ | 24/270 |
| 4,969,923 A * | 11/1990 | Reeder et al. | ........................ | 285/365 |
| 5,242,178 A * | 9/1993 | Galasso et al. | ........................ | 280/204 |
| 5,259,634 A * | 11/1993 | Berner et al. | ........................ | 280/204 |
| 5,375,815 A * | 12/1994 | Akins | ........................ | 256/26 |
| 5,436,810 A * | 7/1995 | Sutherland et al. | ........................ | 362/473 |
| 5,470,088 A * | 11/1995 | Adams | ........................ | 280/204 |
| 5,540,465 A * | 7/1996 | Sisk | ........................ | 285/365 |
| 5,586,367 A * | 12/1996 | Benoit | ........................ | 24/68 SK |
| 5,641,173 A * | 6/1997 | Cobb, Jr. | ........................ | 280/204 |
| 5,669,122 A * | 9/1997 | Benoit | ........................ | 24/71 SK |
| 5,794,957 A * | 8/1998 | Mendon | ........................ | 280/204 |

(Continued)

FOREIGN PATENT DOCUMENTS

EP        0317673        5/1989

(Continued)

OTHER PUBLICATIONS

International Search Report and Written Opinion issued Jul. 2, 2010 in corresponding PCT Application No. PCT/US2009/066069.

(Continued)

*Primary Examiner* — Joshua Kennedy
(74) *Attorney, Agent, or Firm* — Lathrop & Gage LLP; Steven M. Mills (57) ABSTRACT

A hitch for connecting a movable object to a rigid rod which includes a semi-rigid main substrate including a plurality of grooves, a flexible element fixedly formed over the main substrate including a first portion for gripping a rigid rod, a clamp connected to the first portion of the flexible element. The clamp includes a lever that couples the clamp to at least one of the plurality of grooves of the main substrate such that the first portion can grip the rigid rod.

7 Claims, 11 Drawing Sheets

U.S. PATENT DOCUMENTS

| | | | | |
|---|---|---|---|---|
| 6,036,215 | A * | 3/2000 | Bruner | 280/292 |
| D431,635 | S * | 10/2000 | Fange | D23/265 |
| 6,270,100 | B1 * | 8/2001 | Wunderlich | 280/204 |
| 6,286,847 | B1 * | 9/2001 | Perrin | 280/204 |
| 6,305,703 | B1 | 10/2001 | Quick et al. | |
| 6,568,838 | B2 * | 5/2003 | Taylor et al. | 362/474 |
| 6,640,396 | B1 * | 11/2003 | Lin | 24/68 SK |
| 6,948,878 | B1 * | 9/2005 | Smith et al. | 403/110 |
| 6,983,947 | B2 * | 1/2006 | Asbury et al. | 280/204 |
| 7,353,731 | B2 * | 4/2008 | Lin | 74/551.7 |
| 2004/0145147 | A1 * | 7/2004 | Asbury et al. | 280/204 |

FOREIGN PATENT DOCUMENTS

| | | |
|---|---|---|
| EP | 1600353 | 11/2005 |
| JP | 3060071 | 4/1999 |
| KR | 20-0437559 | 12/2007 |

OTHER PUBLICATIONS

International Search Report and Written Opinion issued Jul. 6, 2010 in corresponding PCT Application No. PCT/US2009/066208.

* cited by examiner

UNIVERSAL HITCH WITH INTEGRAL ARTICULATION, CLAMPING AND LOCKING

RELATED APPLICATIONS

This application claims the benefit of U.S. Provisional Patent Application No. 61/200,598, filed Dec. 1, 2008, the content of which is incorporated herein by reference in its entirety.

TECHNICAL FIELD

The present invention related to a universal hitch. More particularly, the present invention is related to a universal hitch having integral articulation, clamping and locking and a system using the same.

BACKGROUND

With environmental awareness and the need to reduce our carbon footprint as a society, there has been an increase in transportation alternatives to driving a car. One such alternative is that people are riding bicycles. Often trailers are attached to bicycles. However, a conventional means for connecting a bicycle to a trailer is to hitch the trailer to the rear wheel axle of the bicycle, and to attach accessory elements to the bicycle itself, such as metal brackets, to enable this hitching. This method requires tools for assembly and requires the needed accessories to remain mounted on the bicycle for further use. The few hitches that do attach to the bicycle seat post, also often require tools to attach the bicycle to the trailer and are not adjustable to different sized seat posts or heights. In addition, the means for attaching the bicycle to the trailer are stiff and are not aligned with the centerline of the bicycle which causes the trailer to drift. Further, the conventional means for connecting a bicycle to a trailer are not lockable to the bicycle and trailer.

SUMMARY

In accordance with an aspect of the invention, a hitch for connecting a movable object to a rigid rod includes a semi-rigid main substrate including a plurality of grooves, a flexible element fixedly formed over the main substrate including a first portion for gripping a rigid rod, a clamp connected to the first portion of the flexible element. The clamp includes a lever that couples the clamp to at least one of the plurality of grooves of the main substrate such that the first portion can grip the rigid rod.

In one embodiment, the flexible element is molded over the main substrate.

In one embodiment, the clamp further includes a wire link.

In one embodiment, a connection rod is coupled to a second portion of the flexible element for connecting to a movable object.

In one embodiment, the clamp and the first portion of the flexible element are adjustable such that the first portion of the flexible element is adjustable for gripping one of a plurality of different rigid rods having a range of different diameters and shapes.

In one embodiment, the rigid rod is at least one of vertical, horizontal, and at an angle.

In one embodiment, the hitch further includes a locking system for locking the hitch to the rigid rod. The locking system includes at least one of a double sided access key, a combination lock and a padlock loop.

In one embodiment, when the clamp is coupled to the main substrate, the clamp pulls the first portion of the flexible element such that the first portion of the element can grip the rigid rod.

In one embodiment, the flexible element further includes a second portion being flexible such that the hitch is bendable in a plurality of directions.

In one embodiment, the hitch further includes an articulation element that allows constrained, multi-dimensional articulation in the hitch, constrained by cross-section and material property.

In one embodiment, the clamp is hand-operable and the hitch is connectable to the rigid rod and the movable object using only the hitch.

In one embodiment, the rigid rod is the seat post of a bicycle.

In one embodiment, the movable object is a trailer.

In accordance with another aspect of the invention, a hitch for connecting a movable object to a rigid rod includes a clamp for gripping the rigid rod, a locking system for locking the hitch to the rigid rod, and an articulation element that allows constrained, multi-dimensional articulation in the hitch, constrained by cross-section and material property.

In one embodiment, the hitch further includes a flexible element. In another embodiment, the clamp and the flexible element are adjustable such that the clamp is adjustable for gripping one of a plurality of different rigid rods having a plurality of different diameters and shapes.

In one embodiment, the clamp is hand operable and the hitch is connectable to the rigid rod and the movable object using only the hitch.

In accordance with another aspect of the invention, a system includes a movable object and a hitch for connecting the movable object to a rigid rod. The hitch includes a clamp for gripping the rigid rod, a locking system for locking the hitch to the rigid rod, and an articulation element that allows constrained, multi-dimensional articulation in the hitch, constrained by cross-section and material property.

In one embodiment, the hitch includes a flexible element. In another embodiment, the clamp and the flexible element are adjustable such that the clamp is adjustable for gripping one of a plurality of different rigid rods having a plurality of different diameters and shapes.

BRIEF DESCRIPTION OF DRAWINGS

The foregoing and other features and advantages of the invention will be apparent for the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
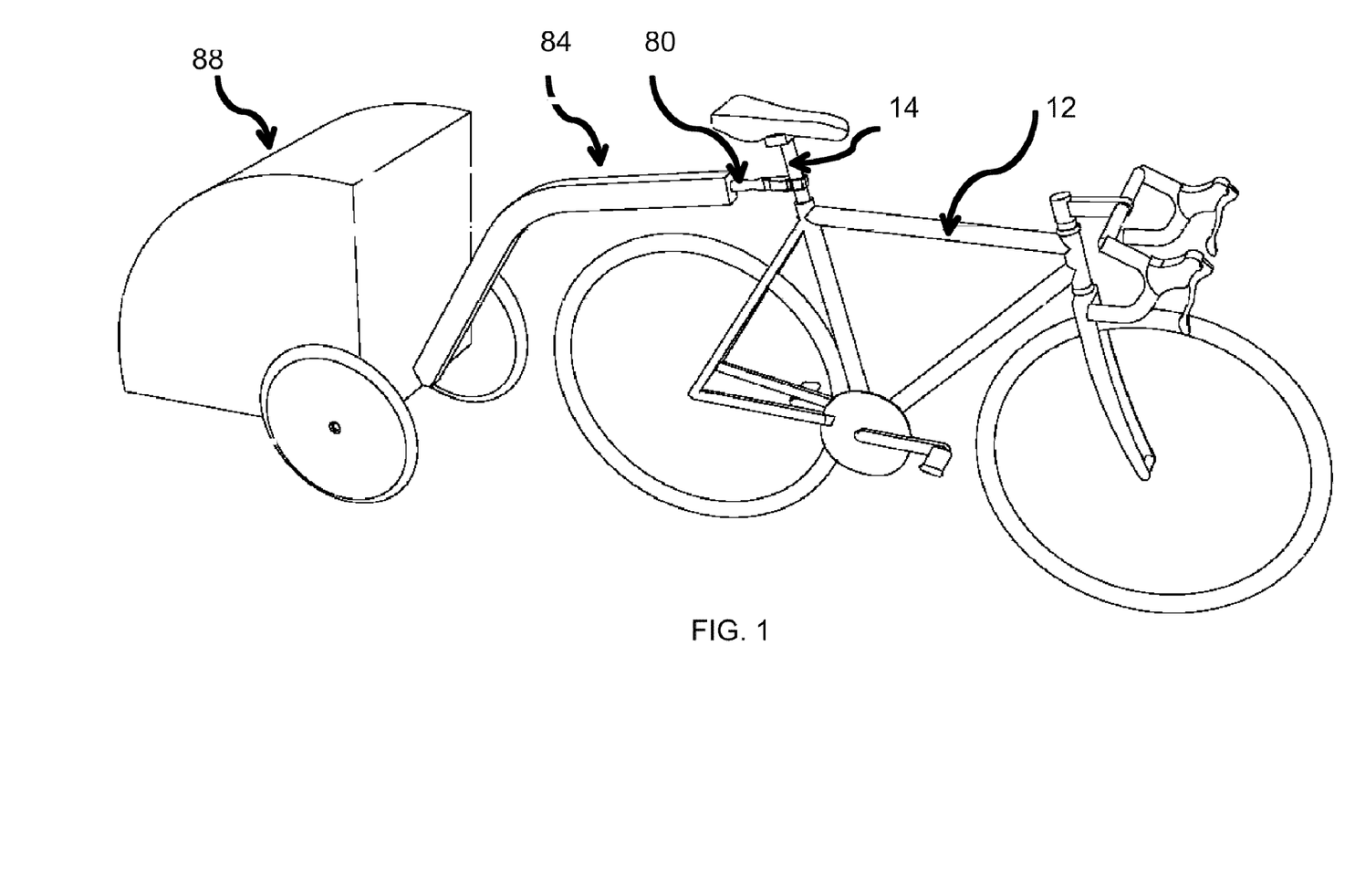
FIG. 1 illustrates a perspective view of a system in accordance with an exemplary embodiment of the present invention.

FIG. 1 is a perspective view of a universal hitch 80 in accordance with an exemplary embodiment of the present invention. A front side of the universal hitch 80 is clasped onto a seat post 14 of a bicycle 12, and a rear side of the universal hitch 80 is coupled to a tow bar 84, towing a trailer 88. The seat post 14 is vertical, horizontal or at an angle. FIG. 1 illustrates the usage and position of the universal hitch in a system including a bicycle 12 and a trailer 88. The universal hitch 80 is described as being coupled to the bicycle 12. However, the present invention is not limited thereto. Alternatively, the hitch is coupled to a rear part of a scooter, a motorcycle, a boat, a moving vehicle on snow or ice, to a belt worn by a person, or other object having a rigid rod. In addition, the universal hitch 80 is described as being coupled to the trailer 88. However, the present invention is not limited thereto. Alternatively, the hitch is coupled to a sled, boat, floating device or other movable object.

The universal hitch 80 combines clamping, locking and trailer articulation functionality in a single assembly. In addition, the universal hitch 80 is adjustable for gripping a plurality of different seat posts having a plurality of different diameters and shapes.

Figure 2:
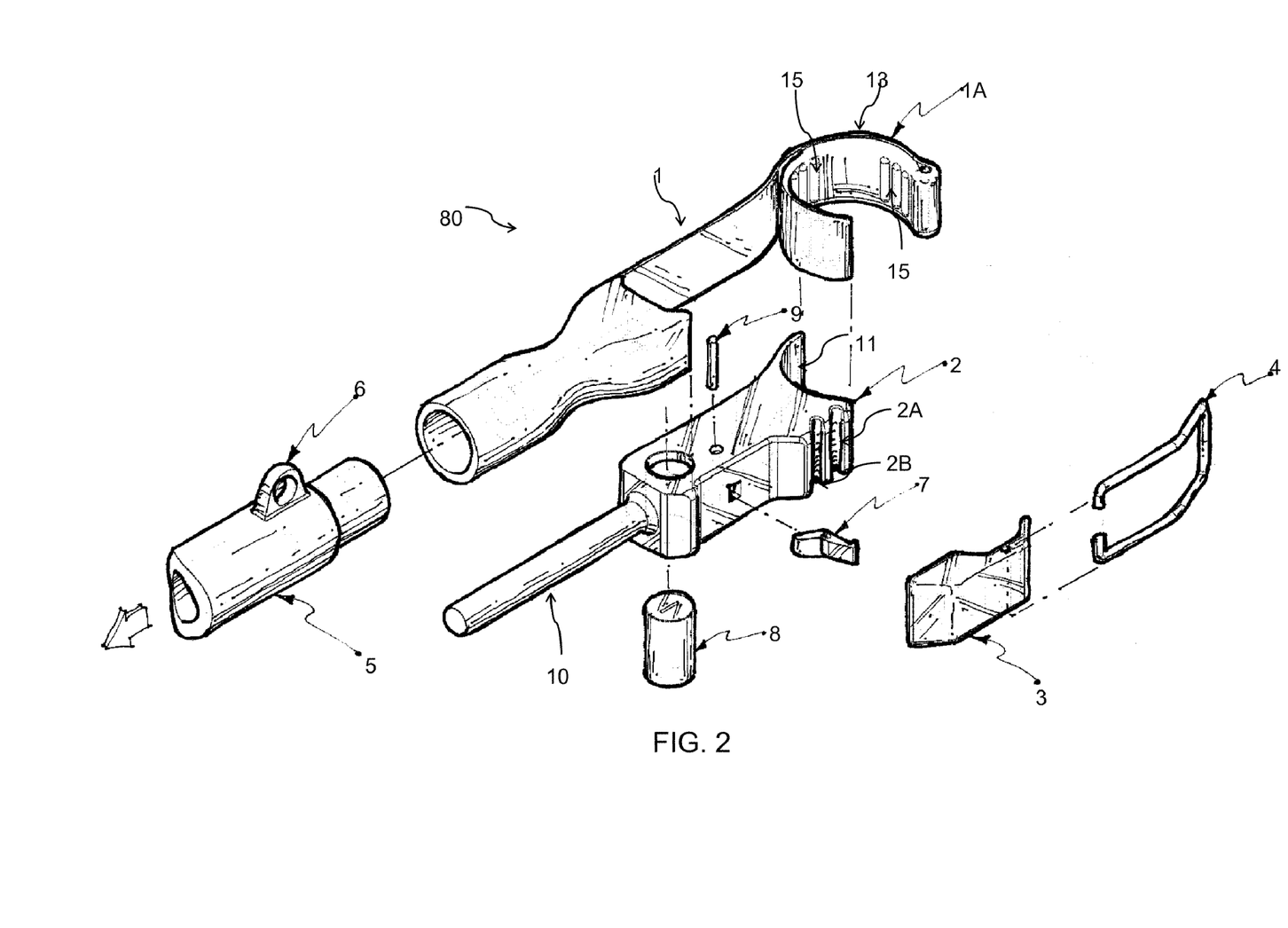
FIG. 2 illustrates an exploded view of a universal hitch in accordance with an exemplary embodiment of the present invention.

FIG. 2 illustrates an exploded view of the universal hitch 80 in accordance with an exemplary embodiment of the present invention. A first element of the universal hitch is a main body molding 2 made of, for example, nylon or a similar material, which is a semi-rigid substrate and includes a single molded plastic entity that serves as a chassis and structural substrate for the universal hitch 80. A second element of the universal hitch 80 is a flex component 1, made of, for example, urethane, which is over-molded onto the main body molding 2 in order to create a single part that has a range of mechanical properties that permit flex in a clamping area 1A and a flexible articulation area 1B.

The main body molding element 2 includes a shaft 10 at a first end which provides structural support of the flex component 1 to allow tuning of motion. The main body molding element 2 further includes a locking system including a lock 8, for example, a two-sided access barrel lock, combination lock or padlock, a lock finger 7 made of, for example, stainless steel, and a small cylindrical lock finger pin 9 made of, for example stainless steel. The main body molding element further includes an interface 11 which interfaces with a C-shaped portion 13 of the flex component 1. The main body molding element further includes grooves 2A and 2B. The main body molding element may alternatively include additional grooves.

The flex component 1 includes a first portion and a second portion. The first portion of the flex component 1 includes the C-shaped portion 13 and grips a rod, for example, the seat post 14. The second portion of the flex component 1 includes a flexible articulation are 1B. The flexible articulation area 1B allows constrained, multi-dimensional articulation in the hitch, constrained by cross-section and material property. The flexible articulation area 1B is flexible such that the hitch is bendable in a plurality of directions.

A clamp area 1A includes an over center cam style clamp and the C-shaped portion 13 of the flex component 1. The clamp area 1A is closed by the over center cam style clamp which includes a clasp lever 3 and a wire link 4. The clasp lever 3, made of, for example, investment cast aluminum or stainless steel, is a rigid component that provides leverage to close the clamp area 1A. The clasp lever 3 is coupled to the wire link 4, made of, for example, stainless steel wire. The wire link 4 translates the force of the clasp lever 3 to the clamp area 1A of the flex component 1, thus, closing the clamp area 1A around a rod, for example, the seat post 14, thereby firmly gripping the rod. This is performed by having the clasp lever 3 clamp onto one of the grooves 2A or 2B in the main body molding 2. The clasp lever 3 and wire link 4 pull the C-shaped portion 13 such that the C-shaped portion 13 grips the seat post 14.

The tow bar 84 connection rod, of FIG. 1, is co-molded onto the rear portion of the universal hitch 80 to a connection bar 5, made of, for example, an aluminum or steel. Thus, a single component assembly that is inherently sealed is formed. The connection bar 5 also includes a safety leash point 6 to ensure continuous connection of the tow bar 84 to the seat post 14 in the event of an emergency.

The C-shaped portion 13 of the universal joint 80 has three sets of grip features 15 arranged axially around the internal surface of the C-shaped portion 13. The grip features 15 are molded into the flexible component 1 and provide a three-point friction grip on the seat post 14. The function of the grip features 15 may be adjusted through changes to their cross-section which affect their relative hardness.

The clasp lever 3 contains internal pocket details, namely, lock receptacles 3A and 3B which are utilized by the locking system to actively lock the device to the bicycle 12. Thus, user interaction is required to overcome the security feature. This lock system is modular, resides within the main body molding 2 and includes the lock 8, for example, a two-sided access barrel lock, combination lock, or padlock, the lock finger 7 made of, for example, stainless steel, and a small cylindrical lock finger pin 9, made of, for example, stainless steel.

Figure 3:
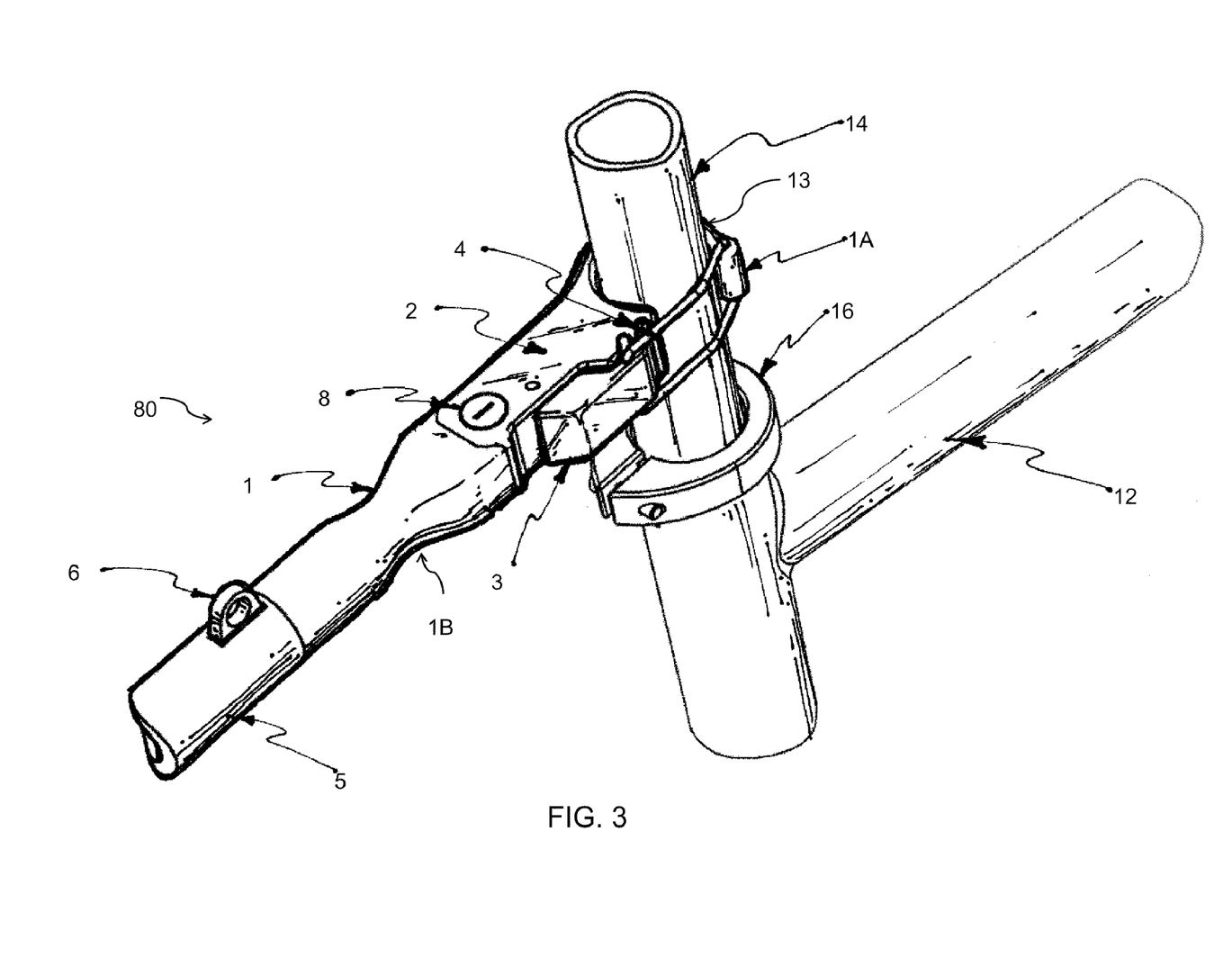
FIG. 3 illustrates a perspective view of the universal hitch of FIG. 2 mounted on a rod in accordance with an exemplary embodiment of the present invention.

FIG. 3 illustrates a perspective view of the universal hitch 80 of FIG. 2 clasped onto the seat post 14 of the bicycle 12 in a closed position. A seat post clamp 16 is part of the bicycle 12. The connection rod 5 is attached to the flex component 1. The flex component 1 is insert molded into the main body molding 2 and coupled to the wire link 4, which is coupled to the clasp lever 3 with the lock system. The lock 8 is assembled into main body molding 2. In FIG. 3, the universal hitch 80 is in a clasped and closed position around the seat post 14 and lock 8 is in a locked position.

The universal hitch 80 attaches to the bicycle 12 via the seat post 14 at any height between a seat rail clamp and the seat post clamp 16 on the bicycle 12. The universal hitch 80 combines clamping, locking and trailer articulation functionality in a single assembly. This combination is achieved through the use of a semi-rigid plastic substrate, namely main body molding 2, which is then combined with a more flexible second component, namely, flex component 1, which is co-molded over the substrate 2 to form a single entity that cannot be disassembled. The clamping and unclamping of the universal hitch 80 requires no tools or assembly.

Figure 4:
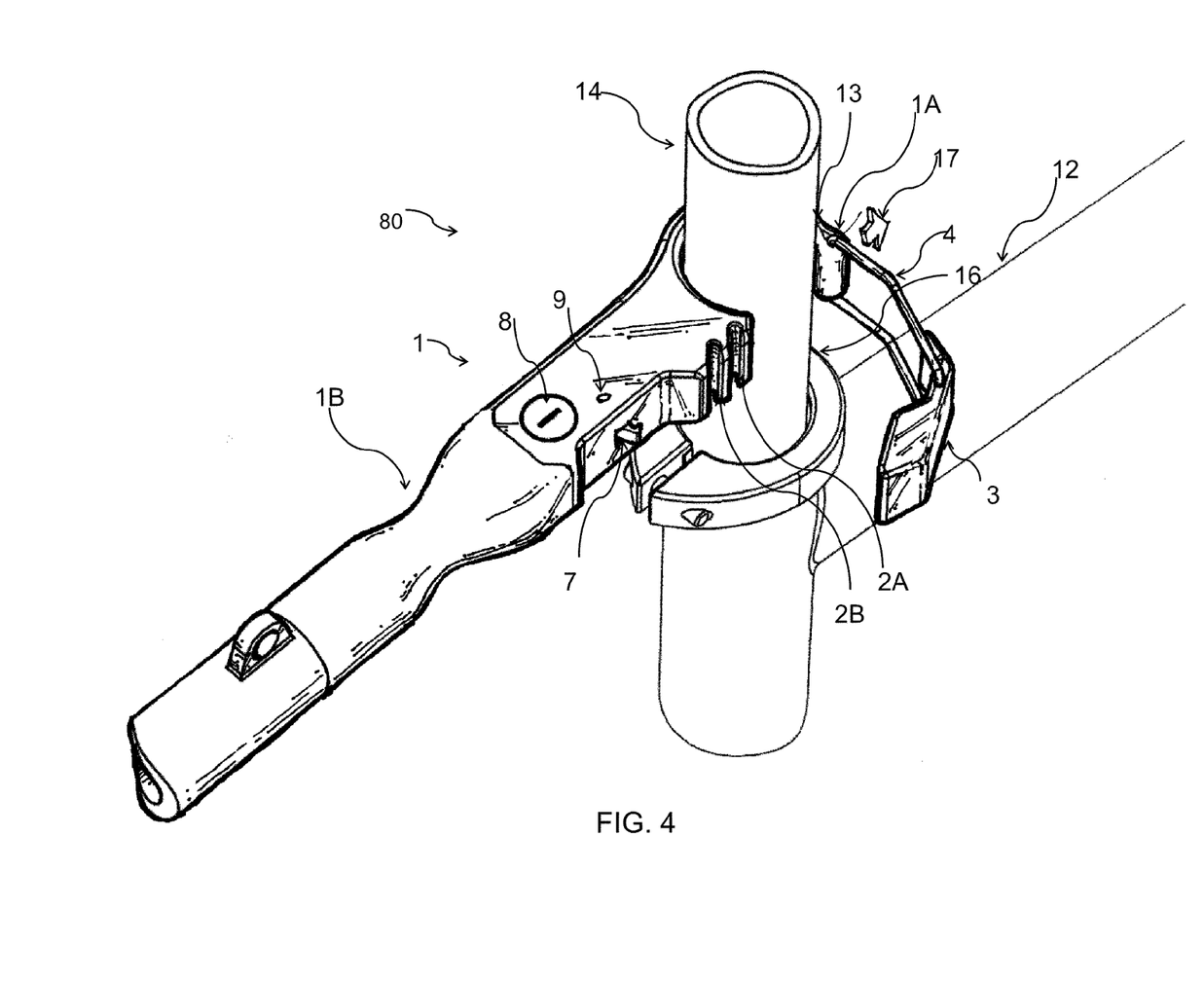
FIG. 4 illustrates a perspective view of the universal hitch of FIG. 2 mounted on a rod in an open position in accordance with an exemplary embodiment of the present invention.

The attachment of the universal hitch 80 to a rod is via a flexible clamping system, namely, clamp area 1A, that is capable of tightly gripping a range of tube sizes commonly found in bicycle seat posts. FIG. 4 illustrates a perspective view of the universal hitch 80 of FIG. 2 to be clasped onto the seat post 14 of a bicycle 12, in an open position. The clamp area 1A of the flex component 1 is comprised of an open latch that flexes in the body of the molding, as illustrated by arrow 17. This allows opening the clamp for a variety of seat post 14 diameters or other rigid rod sizes. The flex articulation area 1B of the universal hitch 80 is engaged during operation, as illustrated in FIG. 1, with a tow bar or, in an alternative embodiment to another object.

Figure 5:
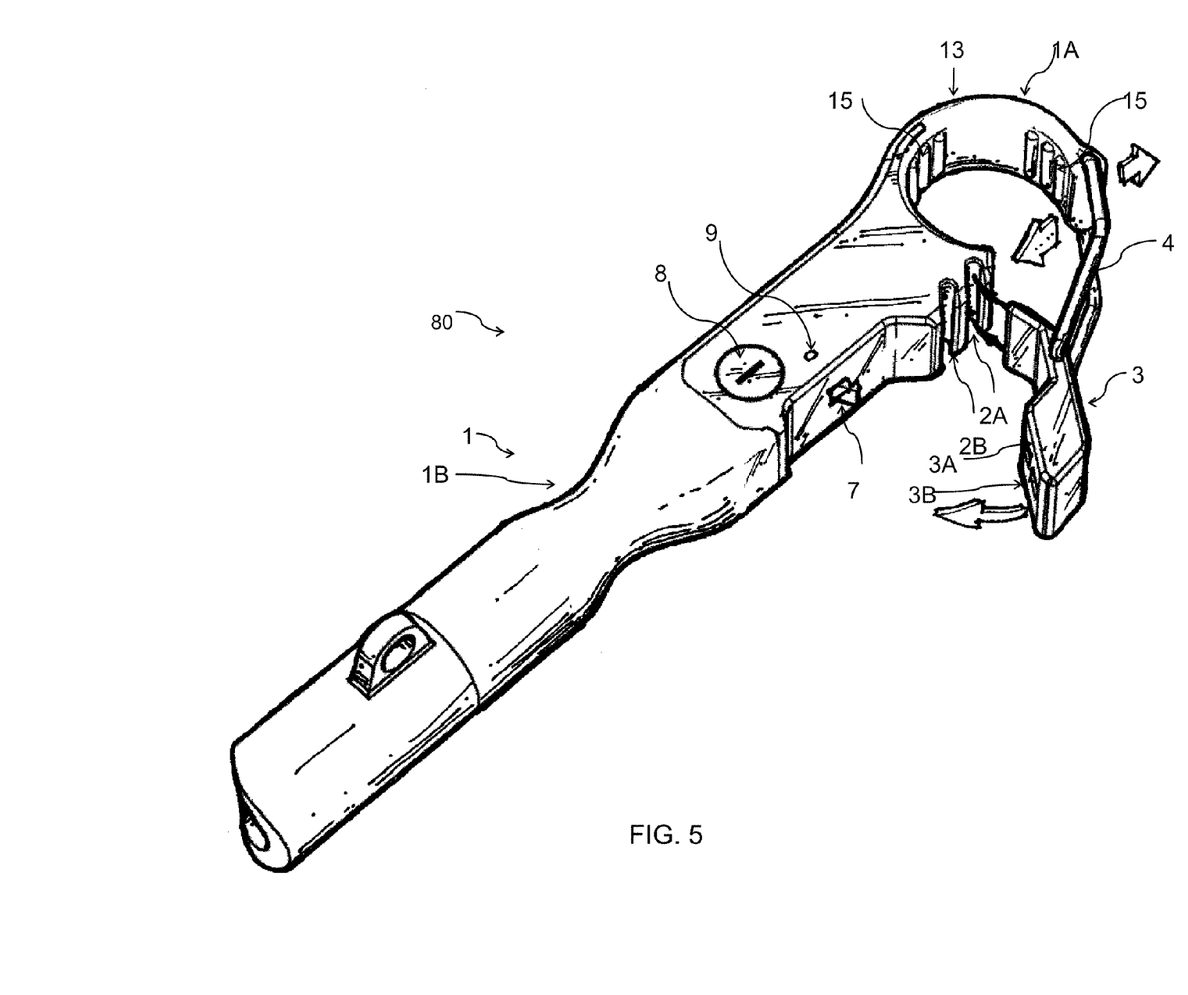
FIG. 5 illustrates a perspective view of the universal hitch of FIG. 2 selecting a clamp location in accordance with an exemplary embodiment of the present invention.
Figure 6:
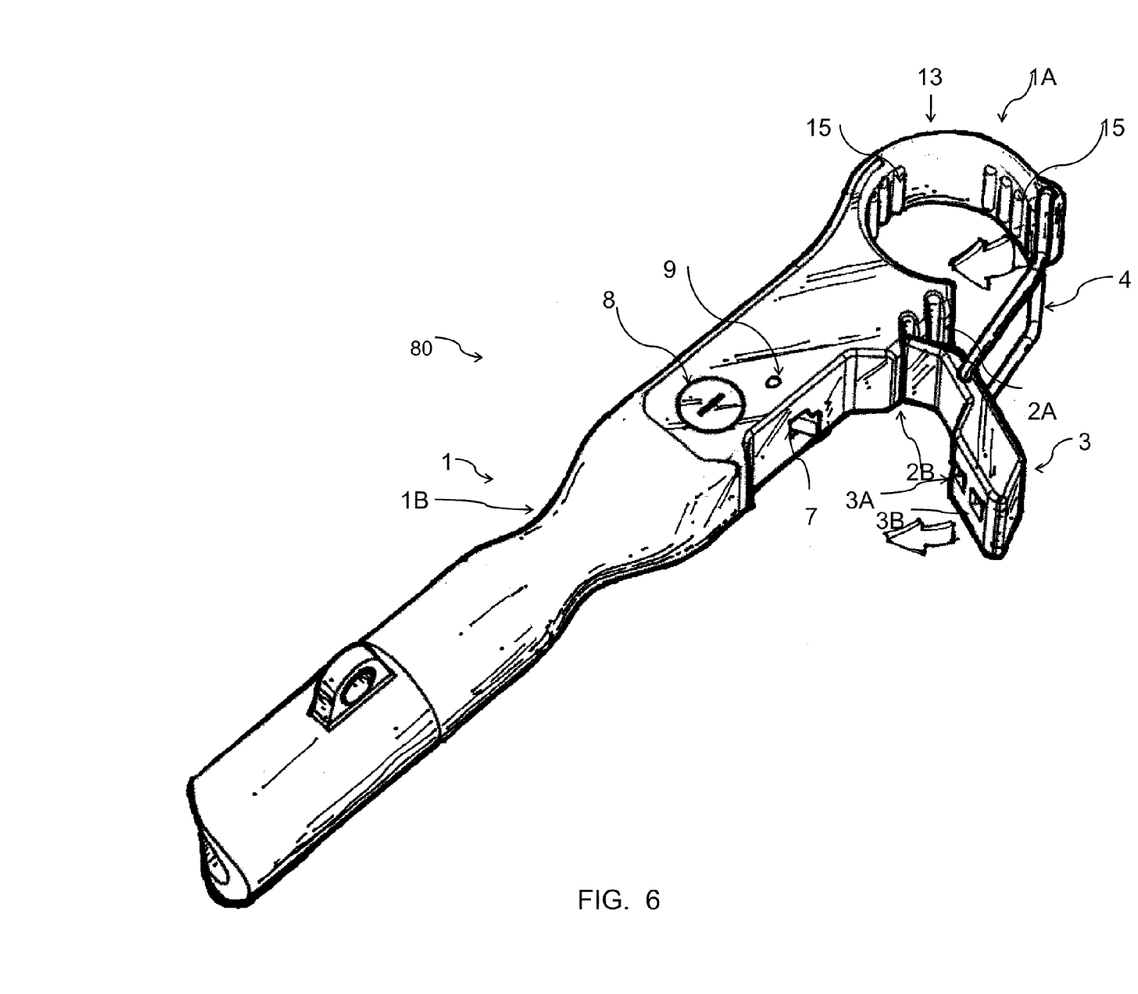
FIG. 6 illustrates a perspective view of the universal hitch of FIG. 2 selecting a clamp location in accordance with another exemplary embodiment of the present invention.
Figure 11A:
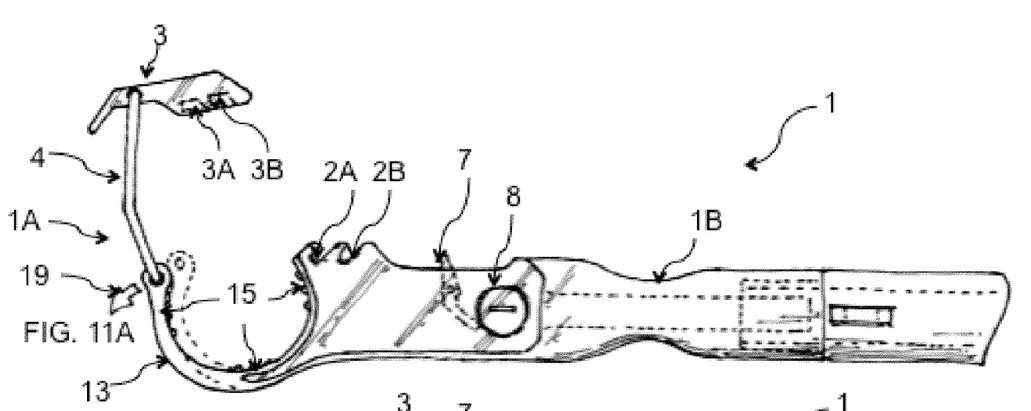
FIGS. 11A-11C illustrate side views of the universal hitch of FIG. 2 in three operational positions, respectively, of the universal hitch in accordance with an exemplary embodiment of the present invention.
Figures 11B, 11C:
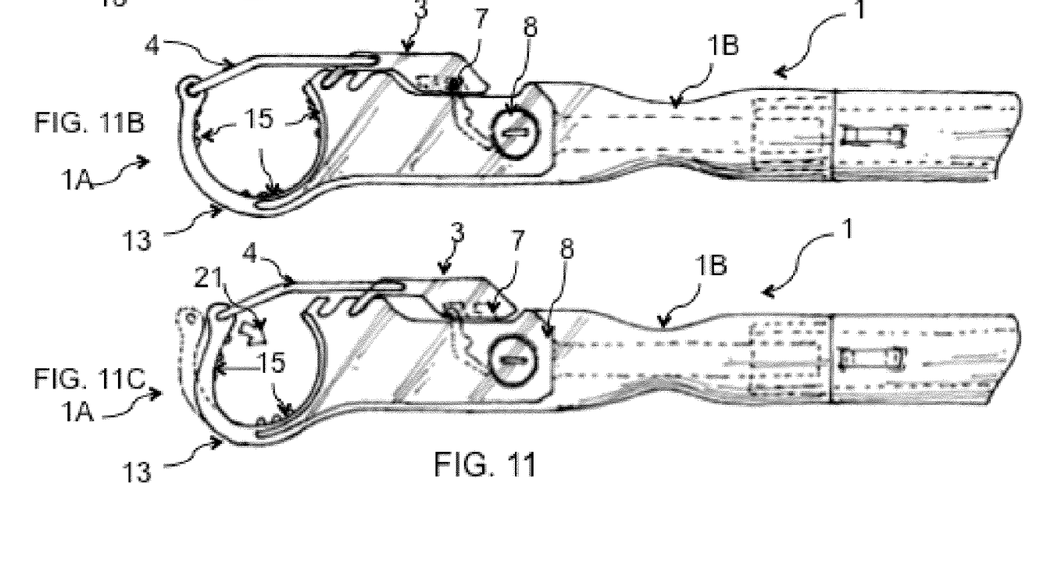

FIGS. 5 and 6 illustrate selecting a clamp location using the wire link 4. In order to adjust the universal hitch 80 to clamp around different sized seat posts, in addition to the flexing 17 of the clasp area in 1A of FIG. 4, a dual mechanism of clasping and locking is utilized. Specifically, the wire link 4 is used to latch onto the main body molding 2 in two locations, namely, groove 2A for larger tube sizes, and groove 2B for smaller tube sizes. There are two lock receptacles 3A and 3B on clasp lever 3 to lock the mechanism into position. Lock receptacle 3A is used for the larger tube sizes and lock receptacle 3B is used for the smaller tube sizes. The lock finger 7, retained in the main body molding 2 by lock lever retainer pin 9, is spring loaded and interlocks with clasp lever 3 in the lock receptacle 3A or 3B, as illustrated in FIGS. 11A-11C. Alternatively, the clasp lever 3 may include additional lock receptacles. The locking mechanism is released via the modular lock 8. FIG. 5 illustrates the clasp lever 3 being positioned in groove 2A for the larger seat post sizes, while FIG. 6 illustrates the clasp lever 3 being positioned in groove 2B for the smaller seat post sizes.

Figure 7:
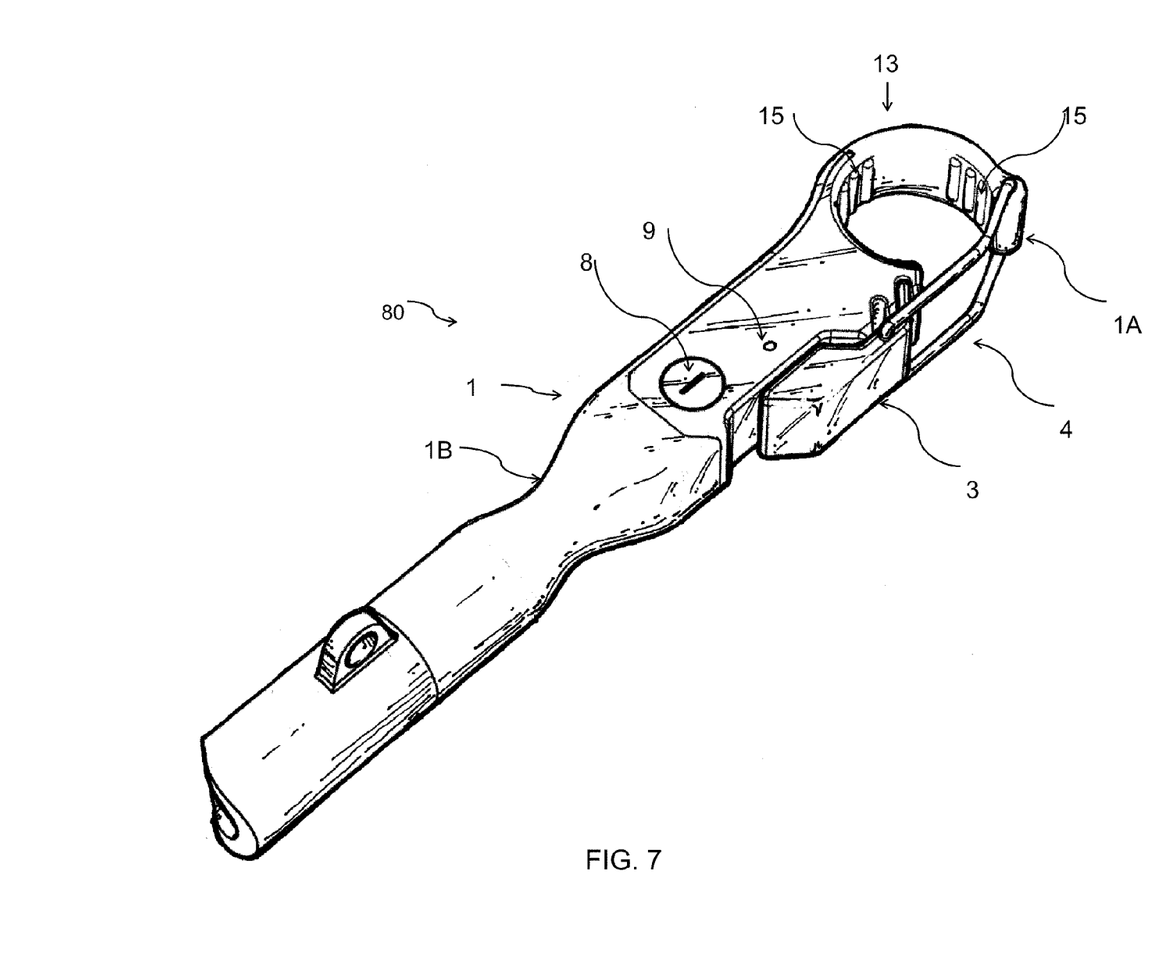
FIG. 7 illustrates a perspective view of the universal hitch of FIG. 2 in a closed position in accordance with an exemplary embodiment of the present invention.

FIG. 7 illustrates the closing of the clasp lever 3 causing the wire clamp 4 to pull the C-shaped portion of the flex component 1 in clamp area 1A into tight, gripping contact with the seat post 14 or any other rod.

Side views of the operational positions of the clasp lever 3 are illustrated in FIGS. 11A, 11B and 11C. FIG. 11A illustrates the clasp lever 3 in an open position permitting the clamp area 1A to flex open, as illustrated by arrow 19 in order to permit simple mounting of the universal hitch 80 on any tube within the accepted range of sizes. FIG. 11B illustrates the clasp lever 3 in a clamping position in groove 2A, similar to FIG. 5, permitting clamping of the universal hitch 80 on the larger range of tube sizes. FIG. 11C illustrates the clasp lever 3 in a clamping position in groove 2B, similar to FIG. 6, allowing clamping of the universal hitch 80 on the smaller range of tube sizes. In FIG. 11C, the clamp area 1A is pulled in, as illustrated by arrow 21 providing a tight grip on the smaller range of tube sizes.

Figure 8:
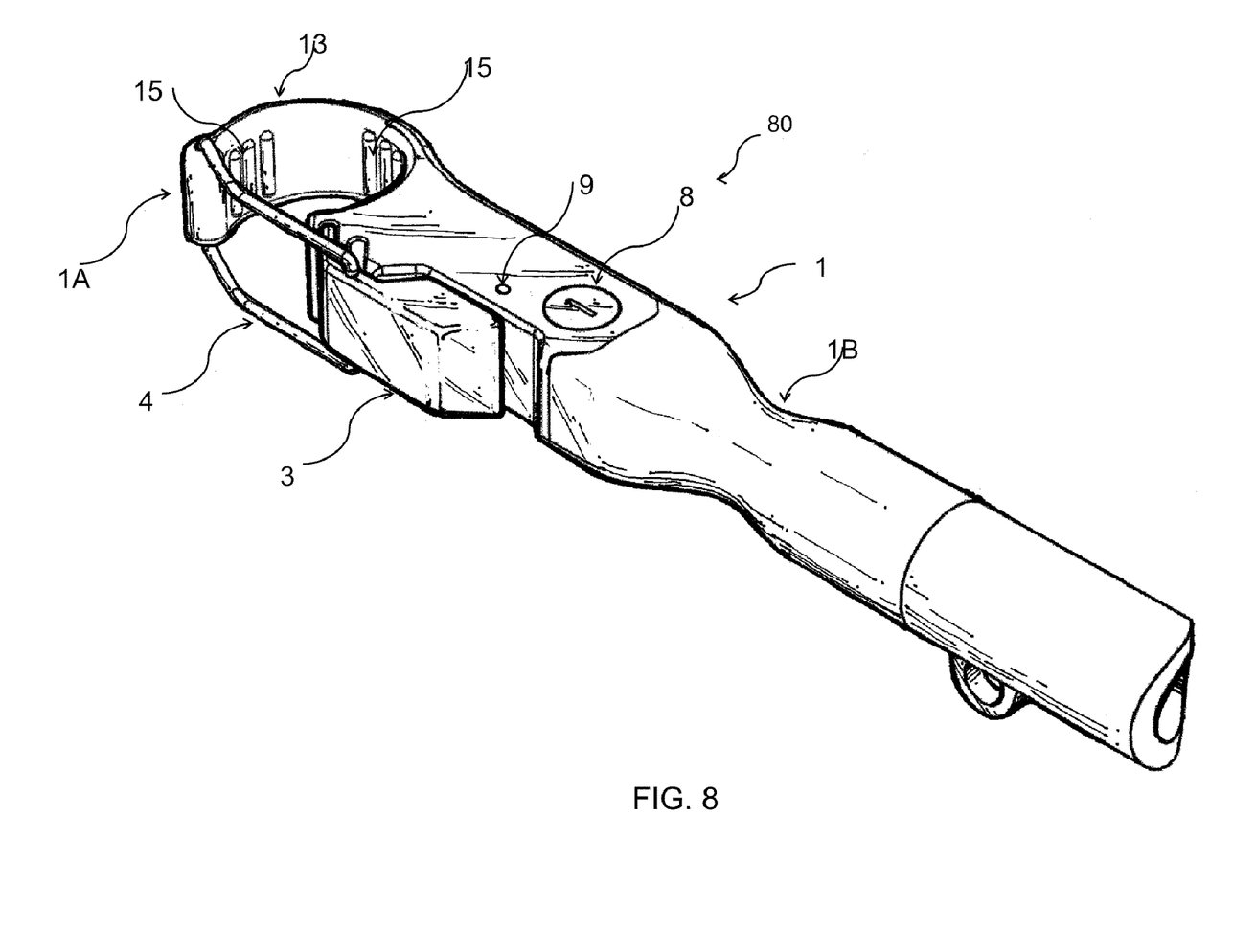
FIG. 8 illustrates a perspective view of the universal hitch of FIG. 2 in a closed position in accordance with an exemplary embodiment of the present invention.

The universal hitch 80 permits mounting the hitch 80 to a rod, for example, the seat post 14, at any orientation. FIG. 8 illustrates that the lock 8 may be accessed from both sides of the universal hitch 80, thereby enabling the mounting of the universal hitch 80 to a rod in a reversible horizontal orientation, as well as in a vertical orientation.

Figure 9:
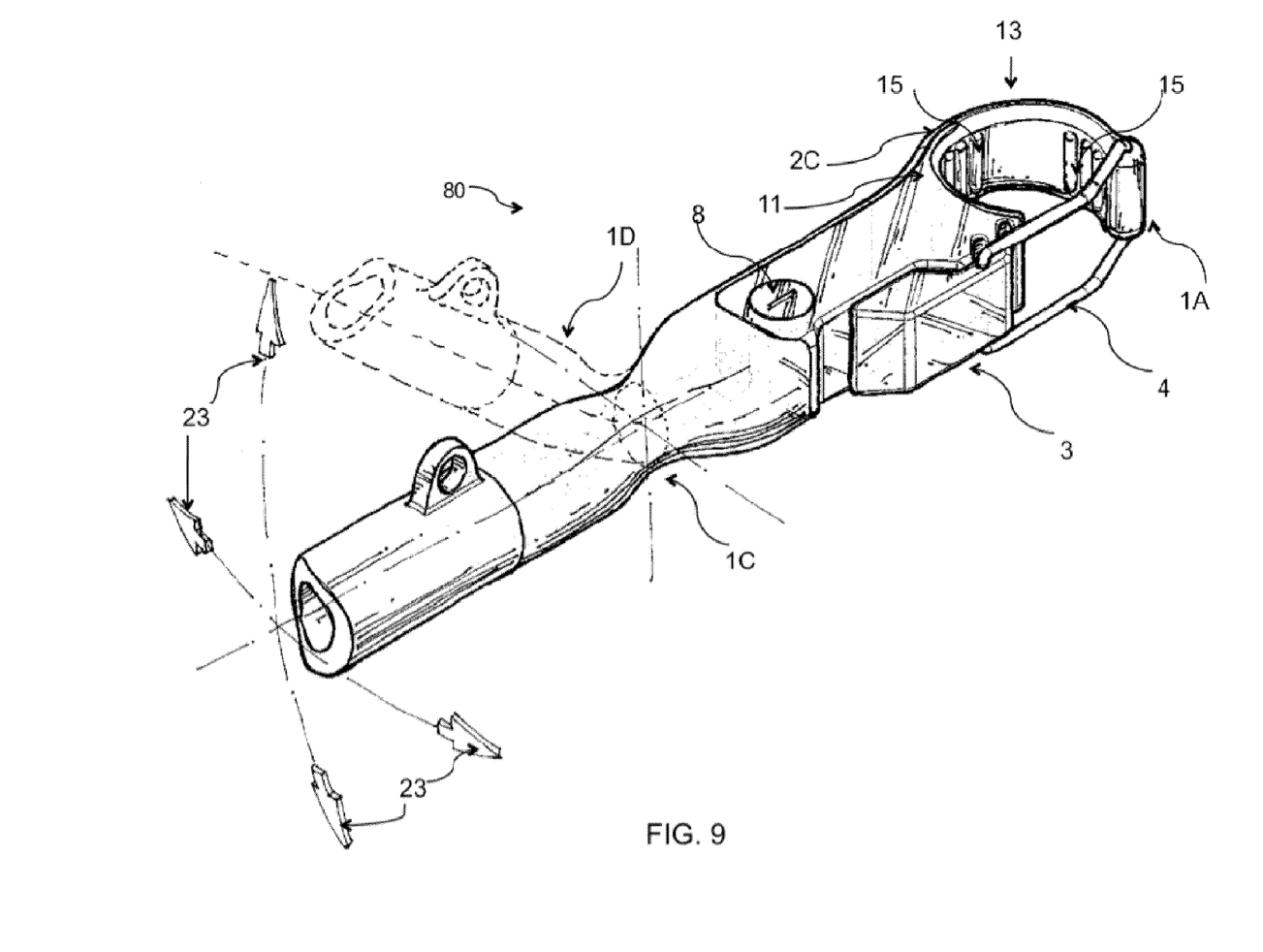
FIG. 9 illustrates a perspective view of the universal hitch of FIG. 2 in accordance with an exemplary embodiment of the present invention.

The hitch incorporates the flexible articulation area 1B that allows the trailer to move in a constrained and controllable fashion. This is achieved through the combined use of the semi rigid substrate, namely, main body molding 2 and the more flexible over-molded portion, namely, flex component 1. The flexible articulation area 1B permits flex, cush and rotation to varying degrees dependent upon specific requirements. FIG. 9 illustrates the bending of the hitch from position 1C to position 1D. The flex can be controlled to be around 360 degrees, as illustrated by arrows 23, including cush compression by adjusting the cross section of the flex component 1 in the flexible articulation area 1B during a manufacturing process or a design process.

Figure 10:
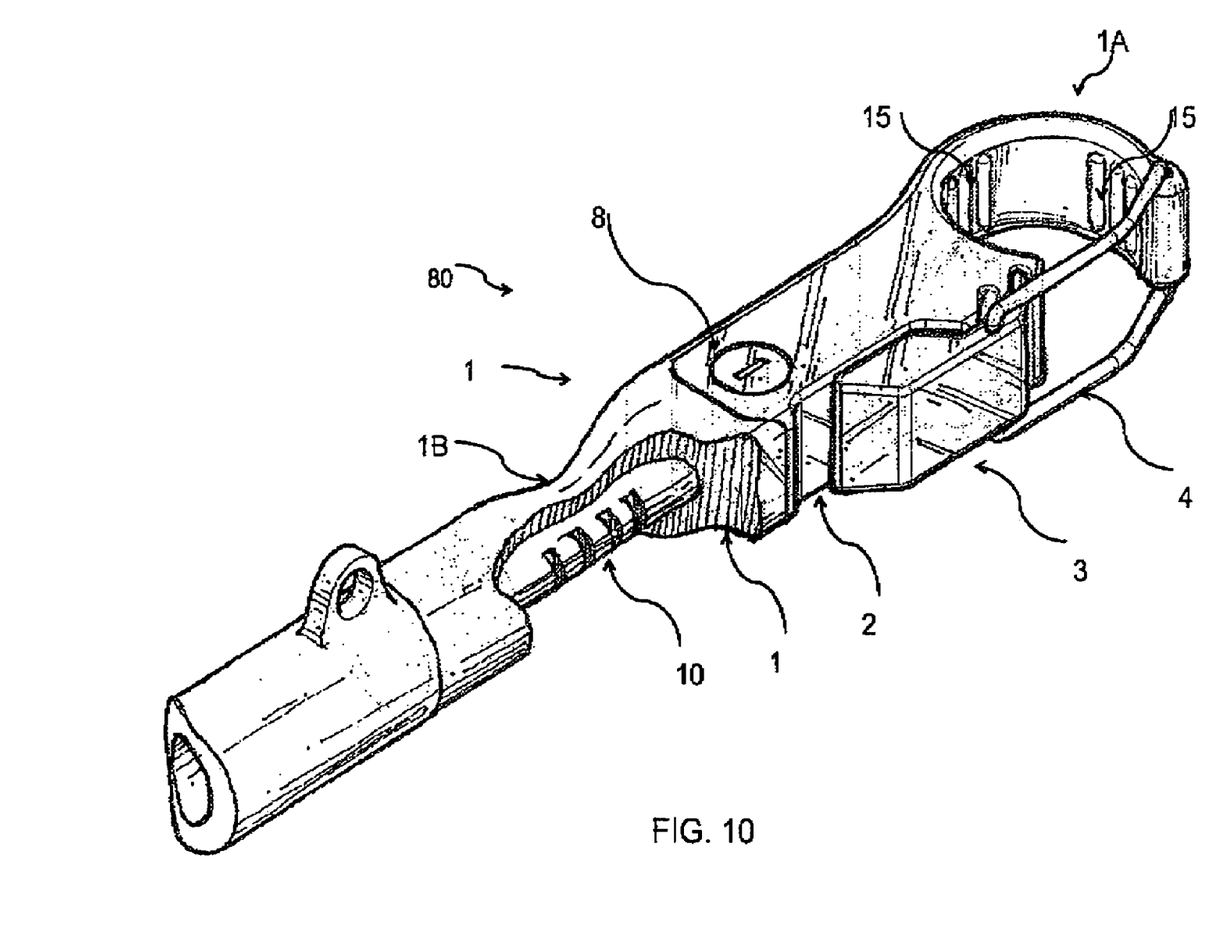
FIG. 10 illustrates a cutaway perspective view of a universal hitch in accordance with an exemplary embodiment of the present invention.

FIG. 10 illustrates a cutaway view of the center section of the flexible articulation area 1B of the main body substrate 2, containing the control rod or shaft 10. A cross-section of the shaft 10 may be changed in order to tune the flexibility of the hitch articulation area 1B. Tuning can be controlled in each axis separately.

In FIG. 9, the clamp area 1A is an integral part of the flex component 1. The flex of the clamp area 1A is controlled with a finger 25 in the flex component 1. The interface 11 of the main body molding 2 is inserted in the finger 25. The finger 25 may be adjusted to in design and manufacturing phases to affect the overall flexibility of the clamp area 1A.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A hitch for connecting a movable object to a rigid rod, comprising:
    a semi-rigid main substrate including a plurality of grooves, the main substrate having a first end;
    a flexible element over at least a portion of an outer surface of the main substrate, the flexible element including a gripping portion being adapted to grip the rigid rod, the gripping portion comprising a periphery which defines an opening, the periphery comprising a first supported portion which is disposed on the first end of the main substrate and is supported by the first end of the main substrate and a flexible second unsupported portion opposite the first supported portion across the opening, the flexible second unsupported portion of the periphery being flexible toward and away from the first supported portion of the periphery such that the opening is changeable between a smaller closed size and a larger open size, respectively; and
    a clamp connectable between the flexible second unsupported portion of the periphery and the main substrate, the clamp being operable between a first closed position in which the flexible second unsupported portion of the periphery is flexed toward the first supported portion of the periphery and a second open position in which the flexible second unsupported portion of the periphery is flexed away from the first supported portion of the periphery, the clamp comprising a lever that couples the clamp to at least one of the plurality of grooves of the main substrate and a wire link attached to the flexible second unsupported portion of the periphery.

2. The hitch of claim 1, further comprising a connection rod coupled to a second portion of the flexible element for connecting to a movable object.

3. The hitch of claim 1, wherein the lever of the clamp can be coupled to a selected one of the plurality of grooves such that the closed size of the opening is selectable.

4. The hitch of claim 1, wherein an axis of the opening is at least one of vertical, horizontal, and at an angle.

5. The hitch of claim 1, further comprising a locking system for locking the clamp in the closed position, wherein the locking system comprises at least one of a double sided access key, a combination lock and a padlock loop.

6. The hitch of claim 1, further comprising an articulation element that allows constrained, multi-dimensional articulation in the hitch, constrained by cross-section and material property, the articulation element comprising a shaft at a second end of the main substrate and an articulation portion of the flexible element, the articulation portion of the flexible element being disposed over and at least partially surrounding the shaft of the main substrate.

7. The hitch of claim 1, wherein the clamp is hand-operable and such that the hitch is connectable to the rigid rod and the movable object without tools.

* * * * *